United States Patent
DeCorte (10) Patent No.: US 10,112,483 B2
(45) Date of Patent: Oct. 30, 2018

(54) HYDRAULIC PUMP ASSEMBLY WITH FORWARD DRIVESHAFT CLEARANCE

(71) Applicant: HHG HOLDINGS, LLC, Houston, TX (US)

(72) Inventor: Philip DeCorte, Tomball, TX (US)

(73) Assignee: HHG Holdings, LLC, Houston, TX (US)

( * ) Notice: Subject to any disclaimer, the term of this patent is extended or adjusted under 35 U.S.C. 154(b) by 83 days.

(21) Appl. No.: 15/133,563

(22) Filed: Apr. 20, 2016

(65) Prior Publication Data

US 2017/0305269 A1 Oct. 26, 2017

(51) Int. Cl.
| | |
|---|---|
| *B60K 25/06* | (2006.01) |
| *F16H 57/04* | (2010.01) |
| *F16H 47/02* | (2006.01) |
| *F16H 57/025* | (2012.01) |
| *F16H 1/20* | (2006.01) |
| *F16H 57/029* | (2012.01) |
| *F16H 57/031* | (2012.01) |

(52) U.S. Cl.
CPC ............... *B60K 25/06* (2013.01); *F16H 1/20* (2013.01); *F16H 47/02* (2013.01); *F16H 57/025* (2013.01); *F16H 57/029* (2013.01); *F16H 57/031* (2013.01); *F16H 57/0408* (2013.01); *F16H 57/0424* (2013.01); *B60Y 2400/82* (2013.01)

(58) Field of Classification Search
CPC ....... B60K 17/28; B60K 17/346; F16H 57/02; F16H 57/021; F16H 2057/02008; F16H 2057/02026; F16H 2057/02043
See application file for complete search history.

(56) References Cited

U.S. PATENT DOCUMENTS

| | | | | |
|---|---|---|---|---|
| 3,148,556 | A * | 9/1964 | Gibbs | F16H 3/02 74/325 |
| 5,480,003 | A * | 1/1996 | Hill | F16C 17/045 184/11.2 |
| 6,044,720 | A * | 4/2000 | Matsufuji | B60K 17/08 74/325 |
| 7,726,126 | B1 * | 6/2010 | Hauser | F04B 23/06 60/486 |
| 2007/0105687 | A1 * | 5/2007 | Lovell | B60K 17/346 475/332 |
| 2009/0301429 | A1 * | 12/2009 | Takashina | F02B 67/06 123/197.5 |

(Continued)

OTHER PUBLICATIONS

Muncie Power Products, Inc., "GBFR Parts List and Sevice Manual," JSB/ENG May 24, 2011, 5 pages.

*Primary Examiner* — James A English
(74) *Attorney, Agent, or Firm* — Foley & Lardner LLP (57) ABSTRACT

A vehicle mounted hydraulic pump assembly includes a gearbox that is configured to be connected to a power take-off that is driven by a transmission of a four-wheel drive vehicle. The gearbox includes an input gear and an output gear where a radius of the input gear is the same as a radius of an output gear. A female output connector is associated with the output gear and is configured to be disposed below a forward driveshaft that is associated with the transmission. A hydraulic pump is connected to the gearbox and is configured to be disposed forward of a transfer case that is also associated with the transmission.

19 Claims, 5 Drawing Sheets

(56) References Cited

U.S. PATENT DOCUMENTS

| | | | | |
|---|---|---|---|---|
| 2012/0029779 A1* | 2/2012 | Dickinson | ............... | F16H 48/32 |
| | | | | 701/69 |
| 2012/0160057 A1* | 6/2012 | Couto | ....................... | F16H 7/06 |
| | | | | 74/665 F |
| 2012/0304811 A1* | 12/2012 | Niggemeier | .............. | F02C 7/32 |
| | | | | 74/606 R |
| 2013/0213157 A1* | 8/2013 | Martin | ................... | B60K 17/28 |
| | | | | 74/15.82 |
| 2013/0247717 A1* | 9/2013 | Hadwani | ............... | F16H 37/065 |
| | | | | 74/665 G |
| 2017/0361706 A1* | 12/2017 | Haggstrom | ............ | B60K 17/28 |

* cited by examiner

HYDRAULIC PUMP ASSEMBLY WITH FORWARD DRIVESHAFT CLEARANCE

TECHNICAL FIELD

This disclosure relates in general to vehicle mounted hydraulic pumps, and, in particular, but not by way of limitation, to a hydraulic pump assembly that provides forward driveshaft clearance.

BACKGROUND

It is known to couple a power take-off (PTO) to an engine of a vehicle to allow the internal combustion engine of the vehicle to provide rotational motion and torque to auxiliary components. For example, if a hydraulic pump is coupled to a PTO, the hydraulic pump can be used to provide hydraulic fluid to an electrical generator or other hydraulic equipment. Oftentimes, hydraulic pumps are coupled to vehicles that have four-wheel drive. In this configuration, a forward driveshaft reduces clearance near the PTO where a pump may be mounted.

A variety of solutions have been attempted to overcome the lack of space or clearance proximate a PTO due to the presence of a forward driveshaft in a four-wheel drive vehicle. One solution is to use a smaller pump that fits within the space constraints dictated by the presence of the forward driveshaft. However, in certain applications it is desirable to employ a pump that is larger than the space available due to the presence of the forward driveshaft. For example, a variable displacement pump is typically larger than a gear pump. When a hydraulic circuit is supplied by a variable displacement pump, a load sense line that is fluidly coupled to the variable displacement pump causes adjustment of the flow delivered by the pump in order to maintain a constant pressure drop across an orifice disposed in the hydraulic circuit. In this manner, variable input provided by the PTO due to fluctuations in revolutions per minute (RPM) of an engine that is not idling, are compensated for by the variable displacement pump and constant hydraulic fluid flow is provided to a hydraulic motor/generator despite fluctuations in vehicle RPM. Thus, by using a variable displacement pump, a generator may be operated to power certain life saving equipment in emergency vehicles while the vehicle is being driven.

A second solution is to employ a gearbox provided by Muncie Power Products, Inc. of Muncie, Ind. to allow a driveshaft to extend from the gearbox rearward of the vehicle and beyond the transfer case where there are less space constraints for mounting a hydraulic pump. The Muncie gearbox employs three gears, which results in a speed increase and less torque than if the pump were coupled directly to the PTO without the Muncie gearbox being coupled therebetween. Moreover, a universal joint is often coupled to the driveshaft rearward beyond the transfer case to allow the pump to be positioned higher, so as not to reduce the drive clearance of the vehicle.

A third solution to the problem of lack of space near a forward driveshaft is to extend a shaft from the power take off through the transfer case where there are less space constraints to negotiate in mounting a hydraulic pump. U.S. Patent Application Publication No. 2013/0213157 filed on Feb. 16, 2012 to Martin et al., the disclosure of which is hereby incorporated by reference, discloses a transfer case including a passage way through which a PTO shaft is received. The drawbacks of this solution are the time and labor required to modify the transfer case to allow a driveshaft to extend through it.

A need exists to adapt a variable displacement pump to a four-wheel drive vehicle in a manner that provides clearance from a forward driveshaft without the drawbacks described above.

SUMMARY

A vehicle mounted hydraulic pump assembly includes a gearbox that is configured to be connected to a power take-off that is driven by a transmission of a four-wheel drive vehicle. The gearbox includes an input gear and an output gear where a radius of the input gear is the same as a radius of an output gear. A female output connector is associated with the output gear and is configured to be disposed below a forward driveshaft that is associated with the transmission. A hydraulic pump is connected to the gearbox and is configured to be disposed forward of a transfer case that is also associated with the transmission.

According to one embodiment, there is no intervening structure between the gearbox and the hydraulic pump, which may be a variable displacement piston-type hydraulic pump.

Technical advantages of a hydraulic pump assembly according to the teachings of the present disclosure include driving a variable displacement hydraulic pump, which is typically larger than a gear pump, with little to no torque reduction. The hydraulic pump can operate at 100% of the PTO output torque.

In addition, the variable displacement hydraulic pump, which is oftentimes more suitable to drive sensitive electric generators, can be positioned forward of the transfer case and clear of the forward driveshaft, without reducing the drive clearance of the four-wheel drive vehicle. Powering certain vehicle mounted hydraulic equipment, such as electric generators, with a variable displacement hydraulic pump allows the hydraulic equipment to be operated while the vehicle is in motion and RPMs of the vehicle vary, as opposed to be constrained to operation while the vehicle is stationary and RPMs can be managed to not significantly fluctuate. Other aspects, features, and advantages will become apparent from the following detailed description when taken in conjunction with the accompanying drawings, which are a part of this disclosure and which illustrate, by way of example, principles of the inventions disclosed.

BRIEF DESCRIPTION OF THE FIGURES

A more complete understanding of the method and apparatus of the present invention may be acquired by reference to the following Detailed Description when taken in conjunction with the accompanying drawings wherein.

DETAILED DESCRIPTION

Figure 1:
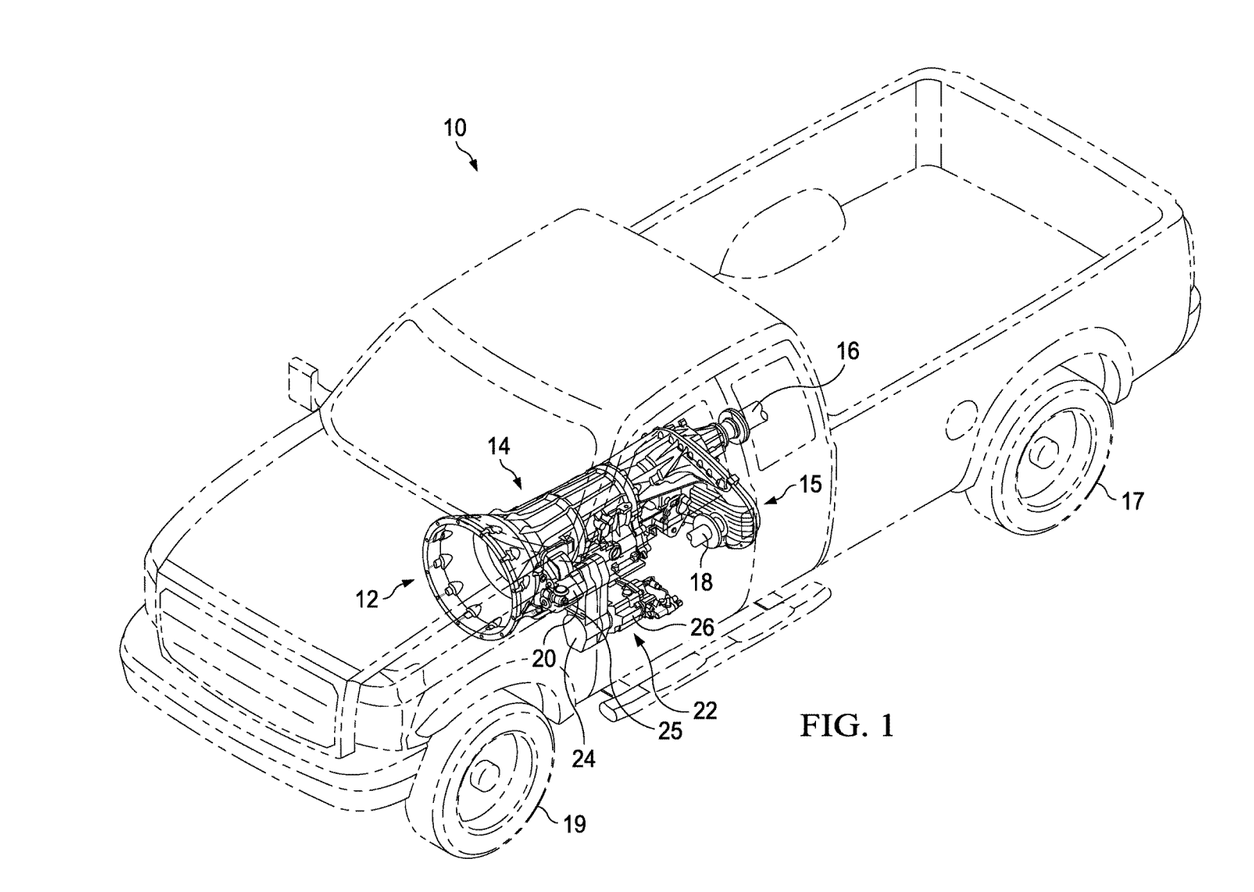
FIG. 1 is a perspective view of a four-wheel drive vehicle equipped with a hydraulic pump drive assembly according to the teachings of the present disclosure.

Reference is made to FIG. 1, which is a perspective view of a four-wheel drive vehicle equipped with a hydraulic pump assembly according to the teachings of the present disclosure. The four-wheel drive vehicle 10 includes a transmission 12. The transmission transmits power and torque to both the rear and the front wheels of the four-wheel drive vehicle. The transmission includes a transmission body 14 and a transfer case 15. A rear driveshaft 16 extends rearward from the transfer case 15 to drive the rear wheels 17, and a forward driveshaft 18 extends forward from the transfer case 15 to drive the front wheels 19. In this manner, the transfer case 15 allows all four wheels of the four-wheel drive vehicle to be driven by the engine. The transfer case 15 uses an internal belt or chain to drive both the rear driveshaft 16 and the forward driveshaft 18 simultaneously. The forward driveshaft 18 is shown with portions broken away to better illustrate components associated with a hydraulic pump drive assembly 22 according to the teachings of the present disclosure.

In addition to the forward driveshaft 18 and the rear driveshaft 16, the transmission 12 also drives a power take-off (PTO) 20. The power take-off 20 is mechanically coupled to the transmission 12 such that the rotational motion and the torque generated by the engine of the vehicle 10 rotate the power take-off 20. According to certain embodiments, the PTO may be a PTO provided under the trade name Parker Chelsea by the Parker Hannifin Corp. with its headquarters in Cleveland, Ohio. According to certain embodiments, the PTO has an output speed rating of 124%. The power take-off 20 is used to drive a hydraulic pump or other auxiliary equipment.

The four-wheel drive vehicle 10 is equipped with the hydraulic pump drive assembly 22 according to the teachings of the present disclosure. The hydraulic pump drive assembly 22 includes a gearbox 24 and a hydraulic pump 26. The gearbox 24 is supported by a bracket 25 that is coupled at one portion of the bracket to the gearbox 24 and at another portion of the bracket to an oil pan of the four-wheel drive vehicle 10. The hydraulic pump drive assembly 22 provides clearance from the forward driveshaft 18 that allows a larger hydraulic pump 26 to be mounted proximate the PTO 20 and forward of the transfer case 15. For example, a variable displacement piston-type hydraulic pump can be mounted as shown without interfering with the forward driveshaft 18 (see FIG. 2B). As described in more detail below, the hydraulic pump drive assembly 22 employs the gearbox 24 to drive the hydraulic pump 26 such that no torque is lost from the PTO 20. That is, the rotational motion of the hydraulic pump is substantially the same when the hydraulic pump 26 is connected to the gearbox 24, as in the illustrated embodiment, as it would be if the hydraulic pump 26 were connected directly to the PTO 20. The gearbox 24 is connected directly to the PTO and provides a gear ratio of 1:1.

Figure 2A:
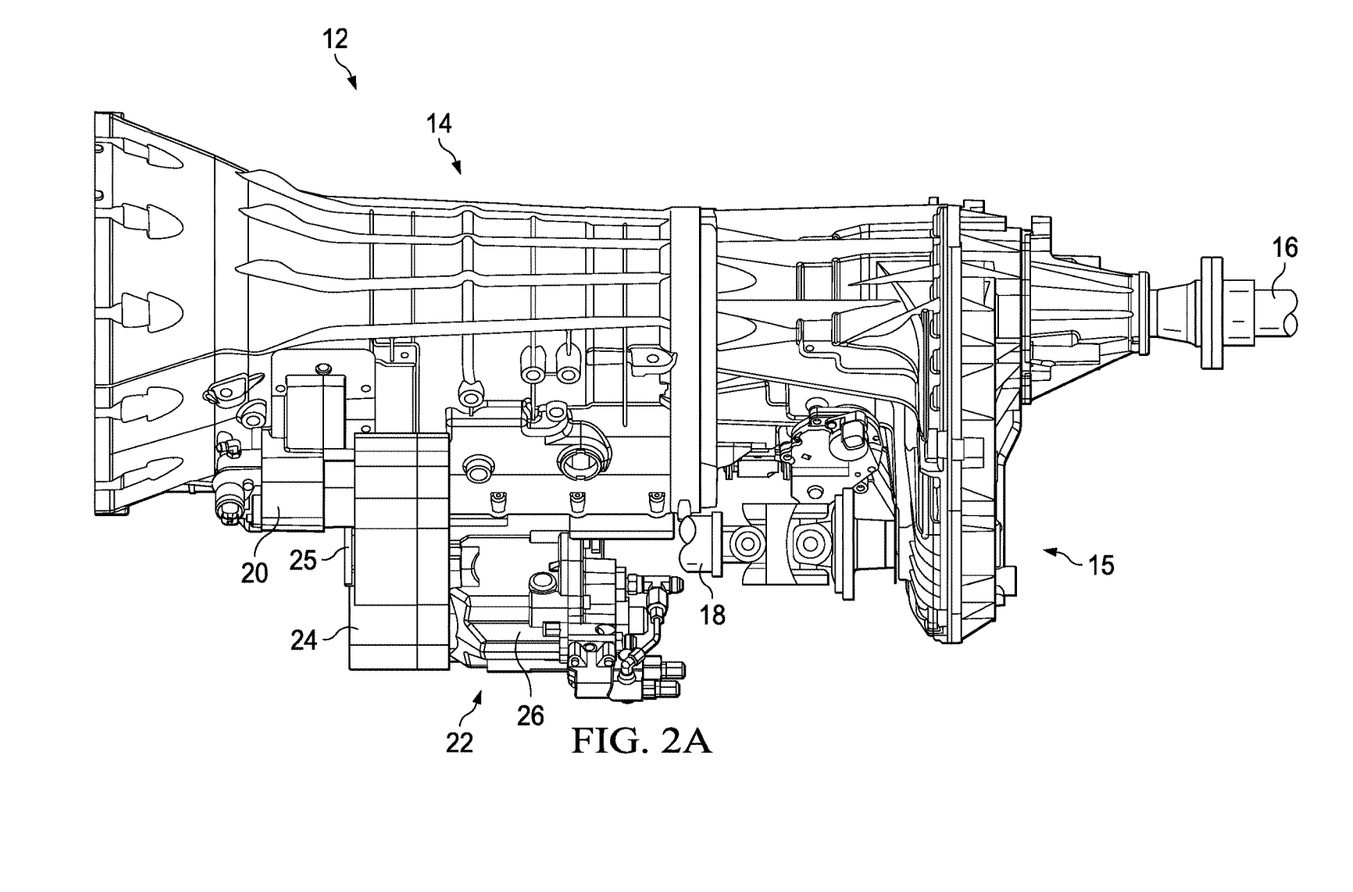
FIGS. 2A and 2B are respectively a side view and an overhead view of the hydraulic pump drive assembly of FIG. 1 drivably coupled to a transmission of a four-wheel drive vehicle.
Figure 2B:
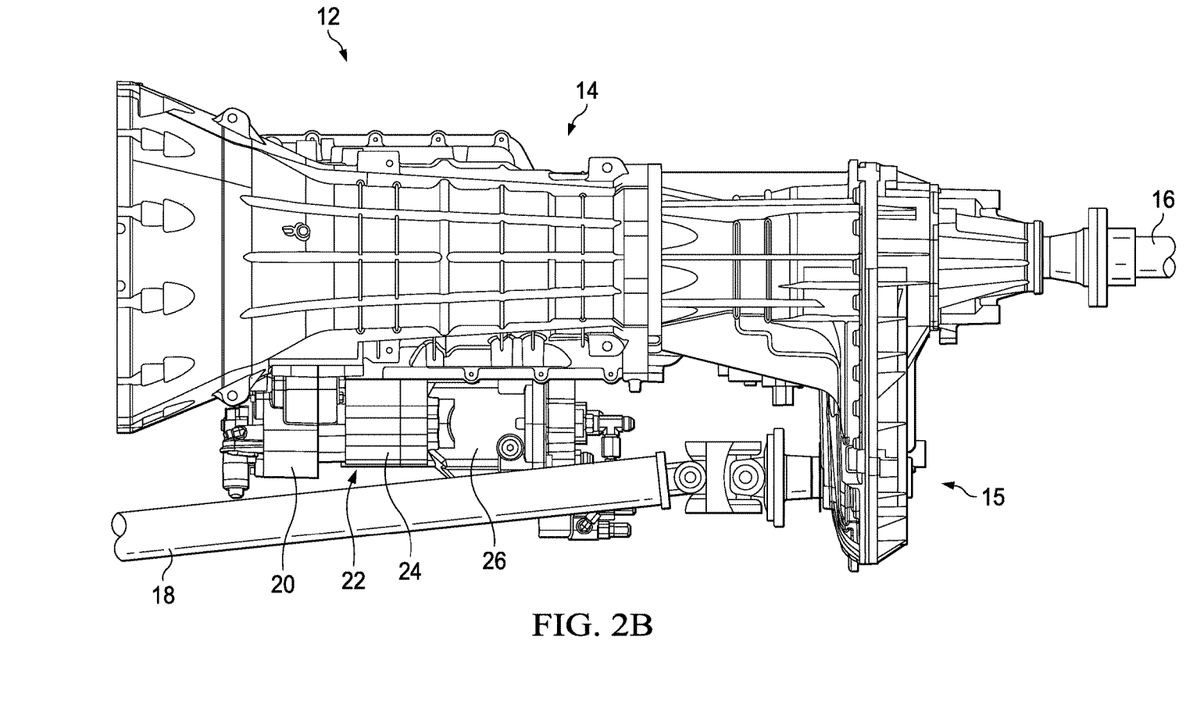

Reference is made to FIGS. 2A and 2B, which are respectively a side view and an overhead view of the transmission 12 and the hydraulic pump drive assembly 22 according to an embodiment of the present disclosure. Viewing both FIGS. 2A and 2B, the position of the hydraulic pump drive assembly 22 relative to the forward driveshaft is illustrated. That is, the hydraulic pump 26 is disposed below the forward driveshaft 18, and is drivably coupled to the power take-off 20 through the gearbox 24. The arrangement of the hydraulic pump 26, in connection with the gearbox 24, provides clearance for a larger pump to be driven by the power take-off 20 of the engine. For example, the hydraulic pump 26 may be a variable displacement hydraulic pump. The variable displacement hydraulic pump 26 employs multiple pistons that rotate to deliver hydraulic fluid to a hydraulic circuit. The variable displacement hydraulic pump 26 allows for sensitive electrical components to receive constant hydraulic fluid flow, despite fluctuations in the revolutions per minute (RPM) of the vehicle's engine. In this manner, auxiliary equipment, for example a generator, can be driven while the vehicle is in motion, as opposed to a hydraulic generator system employing a fixed displacement pump, which is only reliably operated when the vehicle is stationary and the engine of the vehicle is at idle.

Although the hydraulic pump 26 is disposed lower than the power take-off 20, it does not extend lower than the lowest point of the chassis of the vehicle. For example, the front axle, more specifically, a gearbox associated with the front axle, of the four-wheel drive vehicle 10 is closer to the ground than the hydraulic pump 26. Thus, the drive clearance of the four-wheel drive vehicle 10 equipped with the hydraulic pump drive assembly 22 is not reduced by the addition of the hydraulic pump drive assembly 22, so no adjustments to normal driving need to be made.

Figure 3A:
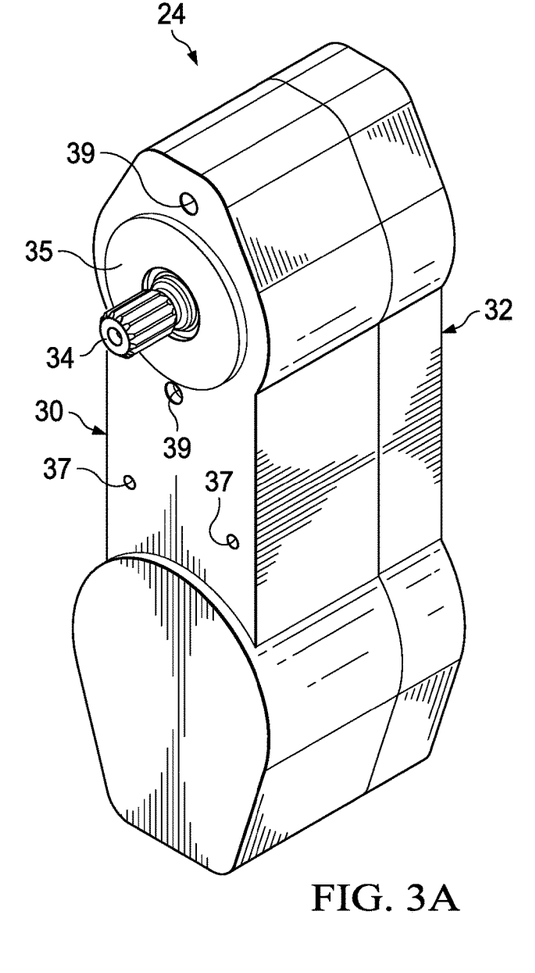
FIGS. 3A and 3B are respectively a perspective view and an exploded view of a gearbox of the hydraulic pump drive assembly shown in FIGS. 1, 2A, and 2B.
Figure 3B:
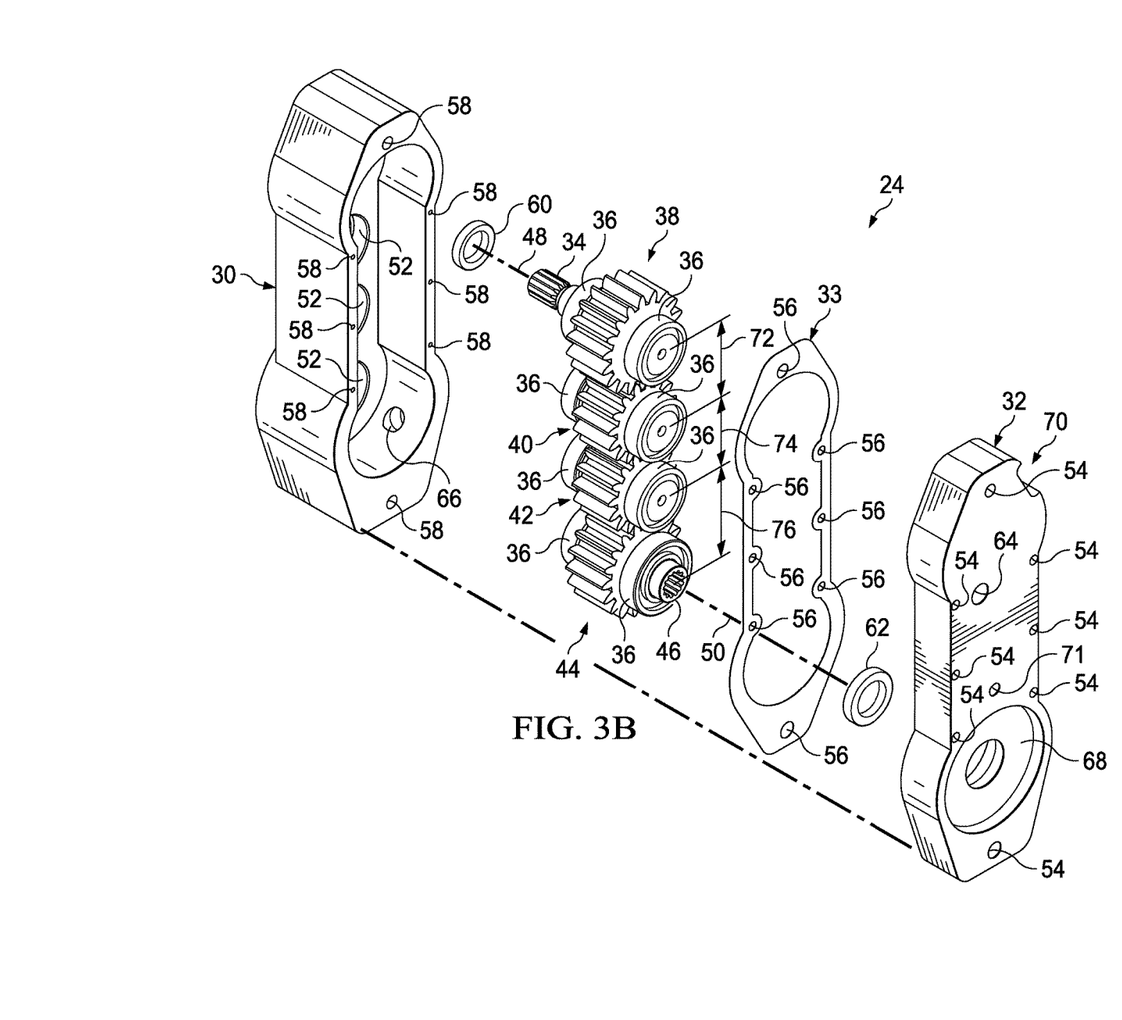

Reference is made to FIGS. 3A and 3B, which are respectively a perspective view and an exploded view of the gearbox 24 illustrated in FIGS. 1, 2A, and 2B. The gearbox 24 includes a housing 30 that houses a plurality of gears according to the teachings of the present disclosure. The housing 30 is coupled to a housing cover 32 with a gasket 33 disposed between the housing 30 and the cover 32 to provide a water-tight seal. FIG. 3A illustrates an input side of the gearbox 24. The input side includes an input shaft 34. The input shaft 34 is a male spline type shaft that couples directly to the power take-off 20. According to one embodiment, the input shaft 34 is a SAE-B 7/8-13 spline shaft. An annular pilot projection 35 also extends from the housing 30 and facilitates mounting the gearbox 24 to the power take-off 20. The annular pilot projection 35 is received by a portion of the PTO 20 such that the PTO 20 engages the input shaft 34 to enable the PTO 20 to provide input to the gearbox 24. The pilot projection 35 on the housing 30 coupled with the corresponding recess on the PTO 20 ensure that the centerline of the input shaft 34 is aligned with the centerline of the output shaft of the PTO 20 such that the shafts are not subject to any undesirable loads due to axial misalignment.

The input side also includes a pair of bracket mounting holes 37. The bracket mounting holes 37 are threaded to receive a correspondingly threaded fastener received through a hole in the mounting bracket 25 to secure the mounting bracket 25 to the gearbox 24. (See FIG. 1) A pair of PTO mounting holes 39 is formed in the housing 30 proximate or through the pilot projection 35. These mounting holes 39 may be threaded or nonthreaded. According to one embodiment, the PTO mounting holes 39 are nonthreaded and a bolt from the PTO 20 is received through each hole 39. A nut is secured to the bolt such that the nut is disposed inside the housing 30. In this manner, the gearbox 24 is assembled in place to the PTO 20. According to an alternate embodiment, the gearbox 24 is assembled separately and the assembled gearbox 24 is attached to the PTO 20 using the PTO mounting holes 39.

With reference to FIG. 3B, the housing 30 houses four gears in vertically meshed engagement, as illustrated. Each of the gears is associated with a pair of ball bearings 36 disposed on each side of the gear. The input shaft 34 receives input from the power take-off 20, which is coupled to the spline of the input shaft 34. The input shaft 34 drives an input gear 38. The rotation of the input gear 38 is facilitated by the pair of ball bearings 36 disposed on either side of the input gear 38. The input gear 38 is meshed with a first idler gear 40, for which rotation is also facilitated by a pair of ball bearings 36 disposed on each side of the first idler gear 40. The first idler gear 40 drives the second idler gear 42, the rotation of which is facilitated by the pair of ball bearings 36 where each ball bearing 36 is disposed on each side of the second idler gear 42. The second idler gear 42 drives the output gear 44, the rotation of which is facilitated by the pair of ball bearings 36 disposed on either side of the output gear 44.

According to one embodiment, a distance 72 from the centerline 48 of the input drive gear 38 and the input shaft 34 to a centerline of the first idler gear 40 is in the range of 2-3 inches, for example 2.75 inches. A distance 74 between a centerline of the first idler gear 40 and the second idler gear 42 is shorter than the distance 72 and is also in a range of 2-3 inches, for example 2.5 inches. Because the input gear 38 and the output gear 44 are the same size, the distance 76 from the centerline of the second idler gear 42 to the centerline of the output gear 44 (and the output shaft connector 46) is the same as the distance 72, for example 2.75 inches. One of ordinary skill in the art can determine a range of radii of each gear given the distances above. The gears have a width in a range of 1-2 inches, for example 1.5 inches.

Directly coupled to the output gear is a female output connector 46. The female output connector 46 extends through the housing cover 32 where it can be coupled to the input of the hydraulic pump 26. According to one embodiment, the female output connector is a SAE-B 7/8-13 involute spline shaft.

The drive input gear 38 and the output gear 44 are the same size gear. In this manner, no torque is lost through gear reduction, so that the output gear 44 produces the same rotation and torque to the hydraulic pump 26 as if the hydraulic pump was directly connected to the power take-off 20. The first idler gear 40 and the second idler gear 42 are the same sized gears. According to one embodiment, the first idler gear 40 and the second idler gear 42 each have a smaller radius than the drive input gear 38 and the output gear 44. As such, flared extended portions of the gearbox housing 30 are disposed at the top and the bottom of the housing 30 such that the larger input gear 38 and the output gear 44 are properly contained within the housing 30. According to one embodiment, a distance between a centerline 48 of the input shaft 34 and a centerline 50 of the output connector 46 is in the range of 6-9 inches, for example 8 inches. According to an alternate embodiment, each of the four gears may be the same size.

It should be noted that with two idler gears 40 and 42, the output gear 44 will rotate the same direction as the drive input gear 38. This configuration facilitates use of a right-hand rotation hydraulic pump 26.

Each of the ball bearings 36 are received and secured in a respective ball bearing recess 52 formed either in the housing 30 or the housing cover 32. The gasket 33 is made of a resilient material, such as a natural or synthetic rubber, and ensures that the junction between the housing 30 and the housing cover 32 is water-tight to avoid water or other contaminates reaching the gears. A plurality of cover mounting through holes 54 is disposed generally about a perimeter of the housing cover 32. A fastener is received through each cover mounting hole 54 and through a corresponding through hole 56 in the gasket 33 and received by a corresponding mounting hole 58 in the housing 30. The mounting holes 58 in the housing 30 may be threaded, and the cover mounting holes 54 in the cover 32 may be countersunk. The fasteners secure the cover 32 to the housing 30 and distribute the clamping force generally evenly across the gasket 33. An input gear washer 60 is associated with the input drive gear 38, and an output gear washer 62 is associated with the output gear 44.

The gearbox 24 also includes one or more lubricant fill holes 64 disposed at an upper portion of the housing 30 such that lubricant can be injected into the housing 30 through the fill hole 64 and filled to the level of the fill hole 64 and can thereby lubricate each of the four gears. A lubricant drain hole 66 is disposed proximate a bottom portion of the housing 30 such that gravity coupled with the motion of the gears facilitates draining of the lubricant in the event the lubricant needs to be replaced. Each of the lubricant fill hole or holes 64 and the lubricant drain hole or holes 66 may be threaded to receive a correspondingly threaded plug (not shown) to maintain the lubricant in the gearbox 24 and to keep debris and other unwanted particles or liquid, such as water, out of the interior of the gearbox 24.

The housing cover 32 includes a pilot recess 68 which is configured to receive a corresponding pilot projection portion of the hydraulic pump 26 such that the hydraulic pump 26 engages the female output connector 46 and the output connector 46 can drive the input of the hydraulic pump 26. The pilot recess 68 and the corresponding pilot projection on the pump 26 ensure that the centerline 50 of the output connector shaft 46 is aligned with the centerline of the input shaft of the pump 26 such that the shafts are not subject to any undesirable loads due to axial misalignment. The housing cover 32 also includes at least one pump mounting hole 71, which may be threaded to receive a fastener to mount the hydraulic pump 26 or a bracket associated with the hydraulic pump 26. According to certain embodiments, the rear of the hydraulic pump 26 may be mounted to another bracket that is also mounted to a portion of the transmission 12 of the four-wheel drive vehicle 10, such as the oil pan.

In one embodiment, the housing cover 32 includes a notch 70. The notch 70 provides clearance for the shifter arm and cable of the transmission 12. The housing 30 and the housing cover 32 may be made of any suitable material. For example, according to one embodiment, the housing 30 and the housing cover 32 may be machined from a billet of aluminum. According to an alternate embodiment, the housing 30 and the housing cover 32 may be cast of any suitable metal, such as aluminum or an aluminum alloy.

In the foregoing description of certain embodiments, specific terminology has been resorted to for the sake of clarity. However, the disclosure is not intended to be limited to the specific terms so selected, and it is to be understood that each specific term includes other technical equivalents which operate in a similar manner to accomplish a similar technical purpose. Terms such as "left" and "right", "front" and "rear", "above" and "below," "top" and "bottom" and the like are used as words of convenience to provide reference points and are not to be construed as limiting terms.

In this specification, the word "comprising" is to be understood in its "open" sense, that is, in the sense of "including", and thus not limited to its "closed" sense, that is the sense of "consisting only of". A corresponding meaning is to be attributed to the corresponding words "comprise", "comprised" and "comprises" where they appear.

In addition, the foregoing describes only some embodiments of the invention(s), and alterations, modifications, additions and/or changes can be made thereto without departing from the scope and spirit of the disclosed embodiments, the embodiments being illustrative and not restrictive.

Furthermore, invention(s) have been described in connection with what are presently considered to be the most practical and preferred embodiments, it is to be understood that the invention is not to be limited to the disclosed embodiments, but on the contrary, is intended to cover various modifications and equivalent arrangements included within the spirit and scope of the invention(s). Also, the various embodiments described above may be implemented in conjunction with other embodiments, e.g., aspects of one embodiment may be combined with aspects of another embodiment to realize yet other embodiments. Further, each independent feature or component of any given assembly may constitute an additional embodiment.

What is claimed is:

1. A vehicle mounted hydraulic pump assembly, comprising:
    a gearbox configured to be connected to a power take-off driven by a transmission of a four-wheel drive vehicle, the gearbox comprising:
        a housing;
        a plurality of vertically aligned gears contained within the housing, the plurality of gears including an input drive gear, at least one idler gear, and an output gear, the input drive gear being a same size as the output gear;
        a pair of ball bearings associated with each gear;
        an input shaft associated with the input drive gear;
        an output shaft associated with the output gear, the output shaft being a female spline shaft configured to be disposed below a forward driveshaft associated with the transmission; and
    a hydraulic pump connected to the gearbox and configured to be disposed forward of a transfer case associated with the transmission.

2. The assembly of claim 1 wherein there is no intervening structure between the gearbox and the hydraulic pump.

3. The assembly of claim 2 wherein there is no intervening structure between the gearbox and the power take-off.

4. The assembly of claim 1 wherein the hydraulic pump is a variable displacement piston-type hydraulic pump.

5. The assembly of claim 1 wherein the at least one idler gear is in engagement with either the input gear or the output gear or both the input gear and the output gear.

6. The assembly of claim 5 wherein the at least one idler gear comprises a first idler gear in engagement with the input gear and a second idler gear in engagement with the output gear.

7. The assembly of claim 6 wherein the first idler gear is in engagement with the second idler gear.

8. The assembly of claim 1 wherein a gear ratio between the input gear and the output gear is 1:1.

9. The assembly of claim 1 further comprising a mounting bracket, one portion of the mounting bracket being connected to the housing of the gearbox and a second portion of the mounting bracket being configured to be coupled to a portion of the transmission of the four-wheel drive vehicle.

10. The assembly of claim 9 wherein the portion of the transmission is an oil pan.

11. An apparatus for coupling a hydraulic pump to a vehicle, comprising:
    a gearbox configured to be connected to a power take-off driven by a transmission of a four-wheel drive vehicle, the gearbox comprising:
        a housing;
        a plurality of vertically aligned gears contained within the housing, the plurality of gears including an input drive gear, at least one idler gear, and an output gear, the input drive gear being a same size as the output gear;
        a pair of ball bearings associated with each gear;
        an input shaft associated with the input drive gear;
        an output shaft associated with the output gear, the output shaft being a female spline shaft configured to be disposed below a forward driveshaft associated with the transmission, the female spline shaft configured to connect to a hydraulic pump disposed forward of a transfer case associated with the transmission.

12. The apparatus of claim 11 wherein the at least one idler gear is in engagement with either the input gear or the output gear or both the input gear and the output gear.

13. The apparatus of claim 12 wherein the at least one idler gear comprises a first idler gear in engagement with the input gear and a second idler gear in engagement with the output gear.

14. The apparatus of claim 13 wherein the first idler gear is in engagement with the second idler gear.

15. A method for coupling a hydraulic pump to a vehicle, comprising:
    connecting a gearbox to a power take-off driven by a transmission of a four-wheel drive vehicle, the gearbox comprising:
        a housing;
        a plurality of vertically aligned gears contained within the housing, the plurality of gears including an input drive gear, at least one idler gear, and an output gear, the input drive gear being a same size as the output gear;
        a pair of ball bearings associated with each gear;
        an input shaft associated with the input drive gear;
        an output shaft associated with the output gear, the output shaft being a female spline shaft disposed below a forward driveshaft associated with the transmission; and
    connecting a hydraulic pump to the female spline shaft, the hydraulic pump being disposed forward of a transfer case associated with the transmission.

16. The method of claim 15 wherein there is no intervening structure between the gearbox and the hydraulic pump.

17. The method of claim 16 wherein there is no intervening structure between the gearbox and the power take-off.

18. The method of claim 15 further comprising connecting one portion of a mounting bracket to the housing of the gearbox, and connecting a second portion of the mounting bracket to a portion of the transmission of the four-wheel drive vehicle.

19. The method of claim 18 wherein the portion of the transmission is an oil pan.

* * * * *